(12) United States Patent
Chen

(10) Patent No.: US 12,472,622 B2
(45) Date of Patent: Nov. 18, 2025

(54) TRANSFER APPARATUS

(71) Applicant: CONTEMPORARY AMPEREX TECHNOLOGY (HONG KONG) LIMITED, Hong Kong (CN)

(72) Inventor: Weifeng Chen, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 0 days.

(21) Appl. No.: 18/487,107

(22) Filed: Oct. 15, 2023

(65) Prior Publication Data

US 2024/0058946 A1 Feb. 22, 2024

Related U.S. Application Data

(63) Continuation of application No. PCT/CN2021/124238, filed on Oct. 15, 2021.

(51) Int. Cl.
| | |
|---|---|
| *B25J 9/00* | (2006.01) |
| *B25J 9/10* | (2006.01) |
| *B25J 9/16* | (2006.01) |

(52) U.S. Cl.
CPC ............ *B25J 9/102* (2013.01); *B25J 9/1697* (2013.01); *B25J 9/0009* (2013.01)

(58) Field of Classification Search
CPC ......... B60L 53/00; B60L 53/80; B25J 9/0009; B25J 9/102; B25J 9/1697
USPC ......... 74/490.05; 29/402.08, 402.04, 402.03, 29/402.01, 888.011, 763, 762, 730, 729
See application file for complete search history.

(56) References Cited

U.S. PATENT DOCUMENTS

| | | | |
|---|---|---|---|
| 2008/0073823 A1 | 3/2008 | Lin | |
| 2015/0307068 A1* | 10/2015 | Gaffoglio | B60L 50/60 414/809 |
| 2016/0107619 A1* | 4/2016 | Clarke | B65G 49/05 414/589 |

FOREIGN PATENT DOCUMENTS

| | | |
|---|---|---|
| CN | 102583044 A | 7/2012 |
| CN | 206068879 U | 4/2017 |
| CN | 207807717 U | 9/2018 |

(Continued)

OTHER PUBLICATIONS

International Search Report received in the corresponding International Application PCT/CN2021/124238, mailed Jul. 12, 2022.

(Continued)

*Primary Examiner* — T. Scott Fix
(74) *Attorney, Agent, or Firm* — K&L Gates LLP

(57) ABSTRACT

Provided are a transfer apparatus. The transfer apparatus includes a frame, a positioning assembly, a rotating and adjusting assembly, and a fixture assembly. The positioning assembly is configured to obtain position information of a battery to be transferred. The rotating and adjusting assembly includes a first drive member in signal connection with the positioning assembly, and a first gear and a second gear engaged with each other, where the first gear is connected to the first drive member, and the second gear is rotatably connected to the frame. The fixture assembly is configured to grip or release the battery to be transferred, and the fixture assembly is connected to a side of the second gear away from the frame. The first drive member is configured to drive the first gear to rotate such that the first gear drives the second gear and the fixture assembly to rotate.

8 Claims, 7 Drawing Sheets

(56) References Cited

FOREIGN PATENT DOCUMENTS

| CN | 109465840 | A | | 3/2019 | | |
|---|---|---|---|---|---|---|
| CN | 109638337 | A | | 4/2019 | | |
| CN | 209480709 | U | | 10/2019 | | |
| CN | 111688532 | A | | 9/2020 | | |
| CN | 112298932 | A | | 2/2021 | | |
| CN | 112693878 | A | | 4/2021 | | |
| CN | 112850504 | A | | 5/2021 | | |
| CN | 213120317 | U | | 5/2021 | | |
| CN | 113120601 | A | | 7/2021 | | |
| CN | 113428047 | A | * | 9/2021 | ............... | B60L 53/80 |
| JP | 6200846 | B2 | | 9/2017 | | |
| KR | 1020170112391 | A | * | 10/2017 | .......... | B60L 11/1822 |
| KR | 102066511 | B1 | * | 7/2019 | ............... | B61B 1/00 |

OTHER PUBLICATIONS

The First Office Action received in the counterpart CN application 202180089995.1, mailed on Aug. 1, 2025, 15 pages with English translation.
The extended European search report received in the counterpart EP application 21960335.4, mailed on Mar. 21, 2025, 8 pages.

* cited by examiner

TRANSFER APPARATUS

CROSS-REFERENCE TO RELATED APPLICATIONS

This application is a continuation of International Application No. PCT/CN2021/124238, filed on Oct. 15, 2021 and entitled "TRANSFER APPARATUS", which is incorporated herein by reference in its entirety.

TECHNICAL FIELD

This application relates to the technical field of energy storage devices, and in particular, to a transfer apparatus.

BACKGROUND

With the rapid development of modern society and the improvement of people's living standard, automobiles are becoming increasingly popular. To alleviate the resulting environmental issues, the production and sales of new energy vehicles are rapidly increasing.

In the prior art, batteries used in some new energy vehicles can be replaced. A battery requiring replacement in a new energy vehicle is typically removed using a fixture, and then a new battery is placed on the new energy vehicle using the fixture. However, the existing fixture is low in operating efficiency and cannot satisfy the needs of users.

In conclusion, it is necessary to design a transfer apparatus to resolve the foregoing technical problems.

SUMMARY

Embodiments of this application provide a transfer apparatus, where a rotating and adjusting assembly is provided to adjust a fixture assembly, so that the accuracy of alignment between the fixture assembly and a battery to be transferred is improved, thereby improving the transferring efficiency.

According to a first aspect, this application provides a transfer apparatus for transferring battery. The transfer apparatus includes:
  a frame;
  a positioning assembly, configured to obtain position information of a battery to be transferred;
  a rotating and adjusting assembly, including a first drive member in signal connection with the positioning assembly, and a first gear and a second gear engaged with each other, where the first gear is connected to the first drive member, and the second gear is rotatably connected to the frame; and
  a fixture assembly, configured to grip or release the battery to be transferred, where the fixture assembly is connected to a side of the second gear away from the frame, and the first drive member is configured to drive, according to the position information, the first gear to rotate such that the first gear drives the second gear and the fixture assembly to rotate together.

The positioning assembly is provided to obtain the position information of the battery to be transferred, so that the rotating and adjusting assembly is capable of adjusting a positional relationship between the fixture assembly and the battery to be transferred according to the position information, making the transfer apparatus more intelligent. The first drive member, the first gear, and the second gear are provided, so that the first drive member drives the first gear to rotate such that the first gear drives the second gear and the fixture assembly to rotate. The fixture assembly and the battery to be transferred can align with each other accurately in a vertical direction, so that the probability of the fixture assembly successfully gripping the battery to be transferred is increased, improving the transferring efficiency.

In some embodiments, the first gear is an outer gear, the second gear is an inner gear having a mounting hole, and the outer gear is disposed in the mounting hole and engaged with the inner gear. The inner gear and the outer gear are engaged with each other, so that a spacing distance between the central axis of the first gear and the central axis of the second gear is reduced. This makes the rotating and adjusting assembly more compact, achieving great space utilization and an overall compact size.

In some embodiments, the positioning assembly includes a camera connected to the frame, where the camera is configured to acquire an image of the battery to be transferred, generate the position information according to the image, and send the position information to the rotating and adjusting assembly; and the rotating and adjusting assembly is configured to control the first drive member according to the position information. The provision of the camera allows visual positioning on the battery to be transferred, thus improving the accuracy of alignment in the vertical direction between the fixture assembly and the battery to be transferred.

In some embodiments, the fixture assembly includes a base connected to the second gear, two clamping members spaced apart, and a drive component disposed on the base, where the drive component is configured to drive the two clamping members to approach or leave each other so as to switch between a closed position and a clamping position. The drive component drives the two clamping members to approach or leave each other so as to grip or release the battery to be transferred.

In some embodiments, the drive component includes a second drive member reciprocating along a first direction, the clamping member includes a clamping jaw and a connecting rod, and two opposite ends of the connecting rod are rotatably connected to the second drive member and the clamping jaw respectively; and the second drive member drives, via two connecting rods, two clamping jaws to approach or leave each other along a second direction; where the first direction and the second direction intersect. The second drive member is rotatably connected to two connecting rods, so that two clamping jaws can approach or leave each other through unidirectional movement of one second drive member.

In some embodiments, the base is provided with a guide slot that extends along the second direction, and the clamping jaw is snapped fit into the guide slot and is capable of moving along the guide slot. The clamping jaw is limited by the guide slot to move along the second direction, so that the stability of the clamping jaw during moving can be improved.

In some embodiments, the fixture assembly is provided in plurality, and the plurality of fixture assemblies are spaced apart sequentially along the first direction. The plurality of fixture assemblies can increase load weight of the transfer apparatus, increase acting points of the fixture assembly on the battery to be transferred, and improve the stability of the battery to be transferred in the transfer process.

In some embodiments, the fixture assembly further includes a plurality of guide members connected to the base, where a surface of the guide member away from the center of the fixture assembly is an oblique plane. The plurality of guide members provided can guide the fixture assembly to move into a box, thus improving the efficiency of the fixture assembly in gripping the battery to be transferred.

In some embodiments, the transfer apparatus further includes a horizontal traveling mechanism and a lifting mechanism, where the horizontal traveling mechanism is capable of driving the frame to move in a horizontal direction, and the lifting mechanism is capable of driving the frame to move in a vertical direction. The horizontal traveling mechanism and the lifting mechanism are able to adjust relative positions of the fixture assembly and the battery to be transferred.

In some embodiments, the transfer apparatus includes at least one in-place sensing assembly, where the in-place sensing assembly includes a position sensor and a movable member, the position sensor is disposed on the base and is in signal connection with the fixture assembly, the movable member penetrates through the base in the vertical direction and is capable of moving along the vertical direction to enter or leave a sensing region of the position sensor, the position sensor is configured to detect whether the movable member enters the sensing region and send a detection signal to the fixture assembly, and the fixture assembly is configured to grip or release, based on the detection signal, the battery to be transferred. The provision of the position sensor and the movable member allows detection of a positional relationship in the vertical direction between the fixture assembly and the battery to be transferred, thus increasing the success rate of the fixture assembly in gripping the battery to be transferred.

The foregoing description is merely an overview of the technical solution of this application. For a better understanding of the technical means in this application such that they can be implemented according to the content of the specification, and to make the above and other objectives, features and advantages of this application more obvious and easier to understand, the following describes specific embodiments of this application.

BRIEF DESCRIPTION OF DRAWINGS

To describe the technical solutions of the embodiments of this application more clearly, the following briefly describes the accompanying drawings required for describing the embodiments of this application. Apparently, the accompanying drawings described below show merely some embodiments of this application, and persons of ordinary skill in the art may still derive other drawings from the accompanying drawings without creative efforts.

Figure 1:
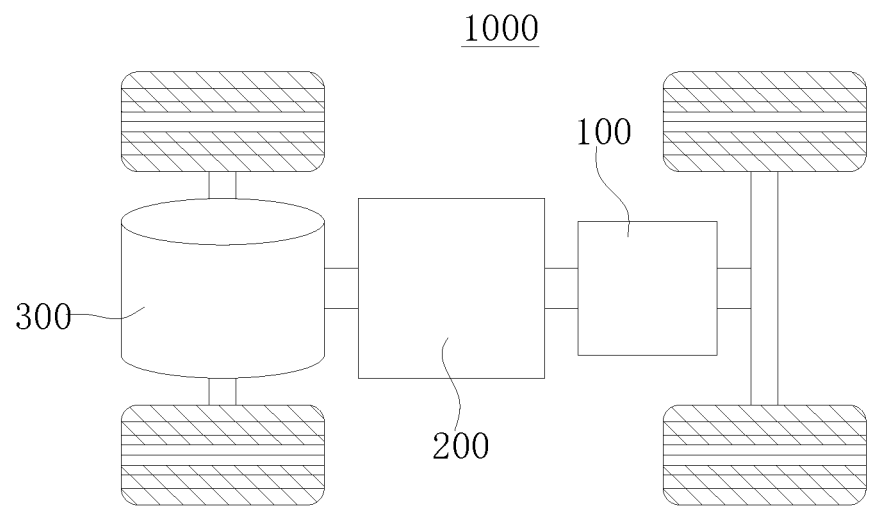
FIG. 1 is a schematic structural diagram of a vehicle according to some embodiments of this application.

The accompanying drawings are not drawn to scale.

Reference signs: vehicle 1000; battery 100; controller 200; motor 300; mounting base 400; upper cover 10; battery cell 20; end cover 201; electrode terminal 201a; housing 202; electrode assembly 203; lower cover 30; bracket 40; side plate 50; frame 1; positioning assembly 2; camera 21; rotating and adjusting assembly 3; first drive member 31; first gear 32; second gear 33; mounting hole 34; fixture assembly 4; base 41; clamping member 42; clamping jaw 421; connecting rod 422; first end 422a; second end 422b; drive component 43; second drive member 431; guide rail 432; mounting seat 433; guide member 44; in-place sensing assembly 5; position sensor 51; and movable member 52.

DESCRIPTION OF EMBODIMENTS

The following further describes the implementations of this application in detail with reference to the accompanying drawings and embodiments. The following detailed description of embodiments and the accompanying drawings are intended to illustrate the principle of this application rather than to limit the scope of this application, meaning that this application is not limited to the embodiments as described.

In the description of this application, it should be noted that, unless otherwise stated, "a plurality of" means at least two; and the orientations or positional relationships indicated by the terms "upper", "lower", "left", "right", "inside", "outside", and the like are merely for ease and brevity of description of this application rather than indicating or implying that the apparatuses or components mentioned must have specific orientations or must be constructed or manipulated according to particular orientations. These terms shall therefore not be construed as limitations on this application. In addition, the terms "first", "second", "third", and the like are merely for the purpose of description and shall not be understood as any indication or implication of relative importance. "Perpendicular" is not perpendicular in the strict sense but within an allowable range of error. "Parallel" is not parallel in the strict sense but within an allowable range of error.

The orientation terms appearing in the following description all refer to the orientations as shown in the drawings and do not limit the specific structure of the application. In the description of this application, it should also be noted that unless otherwise specified and defined explicitly, the terms "mount", "connect", and "join" should be understood in their general senses. For example, they may refer to a fixed connection, a detachable connection, or an integral connection, and may refer to a direct connection or an indirect connection via an intermediate medium. Persons of ordinary skill in the art can understand specific meanings of these terms in this application as appropriate to specific situations.

In this application, the battery cell may include a lithium-ion secondary battery, a lithium-ion primary battery, a lithium-sulfur battery, a sodium-lithium-ion battery, a sodium-ion battery, a magnesium-ion battery, or the like. This is not limited in the embodiments of this application. The battery cell may be cylindrical, flat, cuboid, or of other shapes, which is not limited in the embodiments of this application either. Battery cells are typically divided into three types by packaging method: cylindrical cell, prismatic cell, and pouch cell, which is not limited in the embodiments of this application either.

The battery mentioned in the embodiments of this application is a single physical module that includes one or more battery cells for providing a higher voltage and capacity. For example, the battery mentioned in this application may include a battery module, a battery pack, or the like. A battery typically includes a box configured to enclose one or more battery cells. The box can prevent liquids or other foreign matter from affecting charging or discharging of the battery cell.

The battery cell includes an electrode assembly and an electrolyte. The electrode assembly includes a positive electrode plate, a negative electrode plate, and a separator. The battery cell functions mainly relying on migration of metal ions between the positive electrode plate and the negative electrode plate. The positive electrode plate includes a positive electrode current collector and a positive electrode active substance layer. The positive electrode active substance layer is applied on a surface of the positive electrode current collector. A current collector uncoated with the positive electrode active substance layer protrudes out of a current collector coated with the positive electrode active substance layer, and the current collector uncoated with the positive electrode active substance layer serves as a positive tab after lamination. A lithium-ion battery is used as an example, for which, the positive electrode current collector may be made of aluminum, and the positive electrode active substance may be lithium cobaltate, lithium iron phosphate, ternary lithium, lithium manganate, or the like. The negative electrode plate includes a negative electrode current collector and a negative electrode active substance layer. The negative electrode active substance layer is applied on a surface of the negative electrode current collector. A current collector uncoated with the negative electrode active substance layer protrudes out of the current collector coated with the negative electrode active substance layer, and the current collector uncoated with the negative electrode active substance layer serves as a negative tab after lamination. The negative electrode current collector may be made of copper, and the negative electrode active substance may be carbon, silicon, or the like. The separator may be made of PP (polypropylene, polypropylene), PE (polyethylene, polyethylene), or the like. In addition, the electrode assembly may be a winding structure or a laminated structure, but the embodiments of this application are not limited thereto.

The applicant has found that during use of new energy vehicles, a transfer apparatus is required to transfer batteries that need to be replaced, and the transfer apparatus is low in operating efficiency and consumes time of users. The structure and usage environment of the transfer apparatus have been analyzed and studied. The applicant has found that for the existing transfer apparatus, the transfer apparatus needs to be adjusted first to align with a battery to be transferred in a vertical direction in the horizontal plane, then a fixture in the transfer apparatus is lowered down in the vertical direction such that the fixture is able to grip the battery to be transferred. However, the existing transfer apparatus can only move in two intersecting directions in the horizontal plane, leading to poor accuracy of alignment in the vertical direction between the transfer apparatus and the battery to be transferred. The fixture in the transfer apparatus needs to make multiple attempts to align with the battery to be transferred, leading to low transferring efficiency.

In view of the foregoing problems found by the applicant, the applicant has improved the structure of the transfer apparatus. The technical solution described in embodiments of this application is applicable to any scenario where the battery needs to be transferred, and the battery may be disposed alone or mounted in an electric apparatus.

The electric apparatus may be a vehicle, a ship, a spacecraft, or the like. The vehicle may be a fossil fuel vehicle, a natural-gas vehicle, or a new energy vehicle. The new energy vehicle may be a battery electric vehicle, a hybrid electric vehicle, an extended-range electric vehicle, or the like. The embodiments of this application impose no special limitation on the foregoing electric apparatus.

For ease of description, the electric apparatus of an embodiment of the application being a vehicle 1000 is used as an example for description of the following embodiments.

Referring to FIG. 1, FIG. 1 is a schematic structural diagram of a vehicle according to some embodiments of this application. The vehicle 1000 may be a fossil fuel vehicle, a natural-gas vehicle, or a new energy vehicle, where the new energy vehicle may be a battery electric vehicle, a hybrid electric vehicle, a range-extended vehicle, or the like. The vehicle 1000 is provided with a battery 100 inside, where the battery 100 may be disposed at the bottom, front or rear of the vehicle 1000. The battery 100 may be configured to supply power to the vehicle 1000. For example, the battery 100 may be used as an operational power source for the vehicle 1000. The vehicle 1000 may further include a controller 200 and a motor 300, where the controller 200 is configured to control the battery 100 to supply power to the motor 300, for example, to satisfy power needs of start, navigation, and driving of the vehicle 1000.

In some embodiments of this application, the battery 100 can be used as not only the operational power source for the vehicle 1000 but also a driving power source for the vehicle 1000, replacing or partially replacing fossil fuel or natural gas to provide driving traction for the vehicle 1000.

Figure 2:
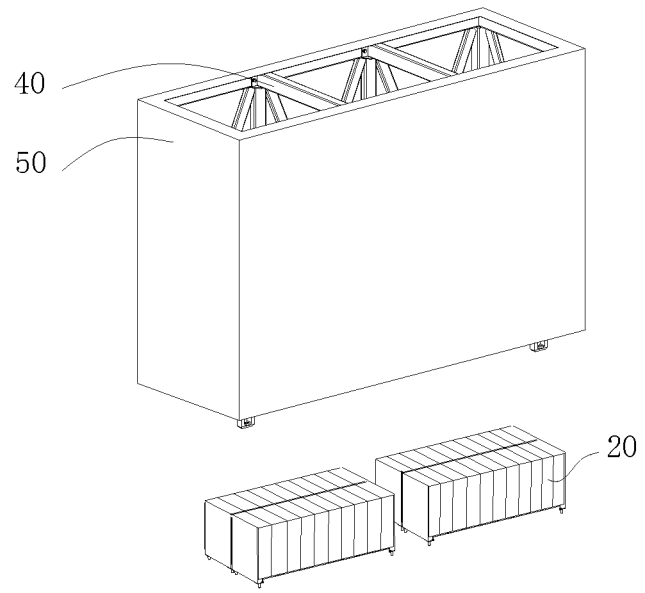
FIG. 2 is a schematic structural exploded view of a battery according to some embodiments of this application.

Referring to FIG. 2, FIG. 2 is an exploded view of a battery according to some embodiments of this application. The battery 100 includes a box and battery cells 20. In some embodiments, the box may include a bracket 40 and side plates 50 covering the bracket 40, where the side plates 50 enclose an accommodating space for accommodating the battery cells 20. The box may have a variety of shapes, for example, cylinder, cuboid, or the like.

Figure 3:
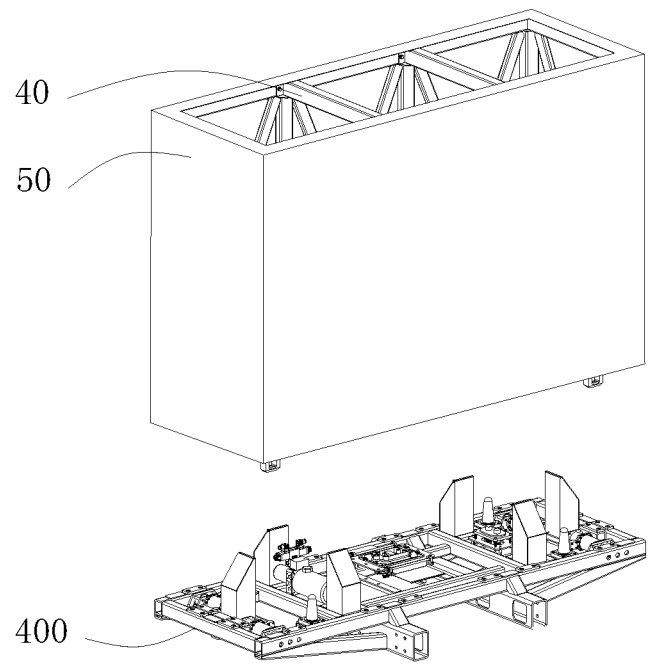
FIG. 3 is a schematic structural exploded view of a battery and a mounting base according to some embodiments of this application.

Referring to FIG. 3, the box of the battery 100 may be directly mounted in the vehicle 1000 or may be connected to a mounting base 400 disposed on the vehicle 1000, so as to fasten the battery 100 to the vehicle 1000. The mounting base 400 may further be provided with a socket or plug corresponding to a power transmission structure of the battery 100 to enable the battery 100 to supply power to an electric apparatus in the vehicle 1000. In some embodiments, a connection structure connected to the mounting base 400 may be provided at the bottom end of the bracket 40, and a handle, beam, or slot for easy access by the transfer apparatus or user may be provided at the top end of the bracket 40.

In the battery 100, the battery cells 20 may be present in plurality, and the plurality of battery cells 20 may be connected in series, parallel, or series-parallel, where being connected in series-parallel means a combination of series and parallel connections of the plurality of battery cells 20. The plurality of battery cells 20 may be directly connected in series, parallel, or series-parallel, and then an entirety of the plurality of battery cells 20 is accommodated in the box; or certainly, the battery 100 may be formed by a plurality of battery cells 20 being connected in series, parallel, or series-parallel first to form a battery module and then a plurality of battery modules being connected in series, parallel, or series-parallel to form an entirety which is accommodated in the box. The battery 100 may further include other structures. For example, the battery 100 may further include a busbar configured to implement electrical connection between the plurality of battery cells 20.

Each battery cell 20 may be a secondary battery or a primary battery, and may be a lithium-sulfur battery, a sodium-ion battery, or a magnesium-ion battery, without being limited thereto. The battery cell 20 may be cylindrical, flat, cuboid, or of other shapes.

Figure 4:
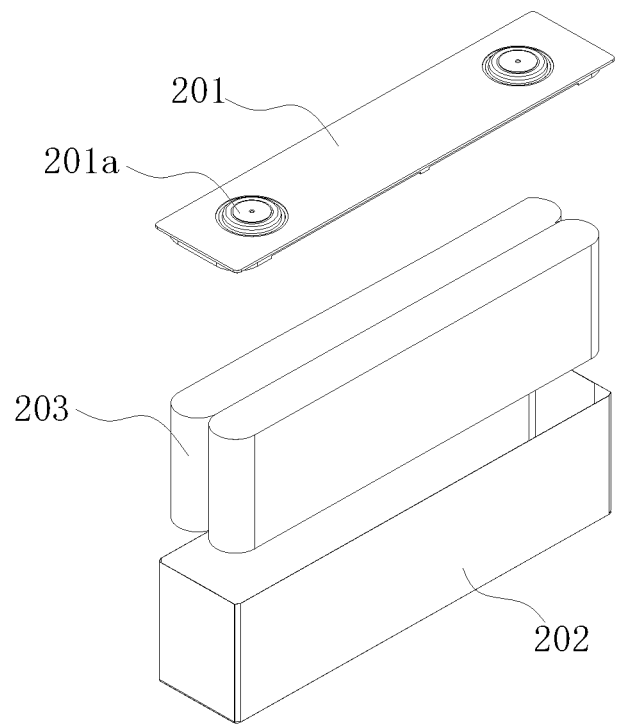
FIG. 4 is a schematic structural exploded view of a battery cell according to some embodiments of this application.

Referring to FIG. 4, FIG. 4 is a schematic structural exploded view of a battery cell according to some embodiments of this application. The battery cell 20 refers to a smallest unit constituting a battery. As shown in FIG. 4, the battery cell 20 includes an end cover 201, a housing 202, an electrode assembly 203, and other functional components.

The end cover 201 refers to a component that covers an opening of the housing 202 to isolate an internal environment of the battery cell 20 from an external environment. Without limitation, the shape of the end cover 201 may be adapted to the shape of the housing 202, so that the end cover 201 can fit the housing 202. Optionally, the end cover 201 may be made of a material with specified hardness and strength (for example, aluminum alloy), so that the end cover 201 is less likely to deform when subjected to extrusion and collision, allowing the battery cell 20 to have higher structural strength and enhanced safety performance. Functional components such as electrode terminals 201a may be provided on the end cover 201. The electrode terminals 201a may be configured to be electrically connected to the electrode assembly 203 for outputting or inputting electrical energy of the battery cell 20. In some embodiments, the end cover 201 may further be provided with a pressure relief mechanism configured to relieve internal pressure when the internal pressure or temperature of the battery cell 20 reaches a threshold. The end cover 201 may also be made of various materials, such as copper, iron, aluminum, stainless steel, aluminum alloy, and plastic. This is not particularly limited in the embodiments of this application. In some embodiments, an insulator may also be provided at an inner side of the end cover 201. The insulator may be configured to isolate an electrically connected component in the housing 202 from the end cover 201 to reduce a risk of short circuit. For example, the insulator may be made of plastic, rubber, or the like.

The housing 202 is an assembly configured to form an internal environment of the battery cell 20 together with the end cover 201, where the formed internal environment may be used to accommodate the electrode assembly 203, an electrolyte, and other components. The housing 202 and the end cover 201 may be separate components, an opening may be provided in the housing 202, and the end cover 201 covers the opening to form the internal environment of the battery cell 20. Without limitation, the end cover 201 and the housing 202 may also be integrated. Specifically, the end cover 201 and the housing 202 may form a shared connection surface before other components are disposed inside the housing, and then the end cover 201 covers the housing 202 when the inside of the housing 202 needs to be enclosed. The housing 202 may have various shapes and sizes, such as a cuboid shape, a cylindrical shape, a hexagonal prism shape, or the like. Specifically, the shape of the housing 202 may be determined based on a specific shape and size of the electrode assembly 203. The housing 202 may be made of various materials, such as copper, iron, aluminum, stainless steel, aluminum alloy, and plastic. This is not particularly limited in the embodiments of this application.

The electrode assembly 203 is a component in which electrochemical reactions take place in the battery cell 20. The housing 202 may include one or more electrode assemblies 203. The electrode assembly 203 is mainly formed by winding or stacking a positive electrode plate and a negative electrode plate, and a separator is typically disposed between the positive electrode plate and the negative electrode plate. Parts of the positive electrode plate and the negative electrode plate with active substances constitute a main body of the electrode assembly 203, while parts of the positive electrode plate and the negative electrode plate without active substances separately constitute a tab. A positive tab and a negative tab may both be located at one end of the main body or be located at two ends of the main body respectively. During charge and discharge of the battery, a positive electrode active substance and a negative electrode active substance react with an electrolyte, and the tabs are connected to electrode terminals 201a to form a current loop.

Figure 5:
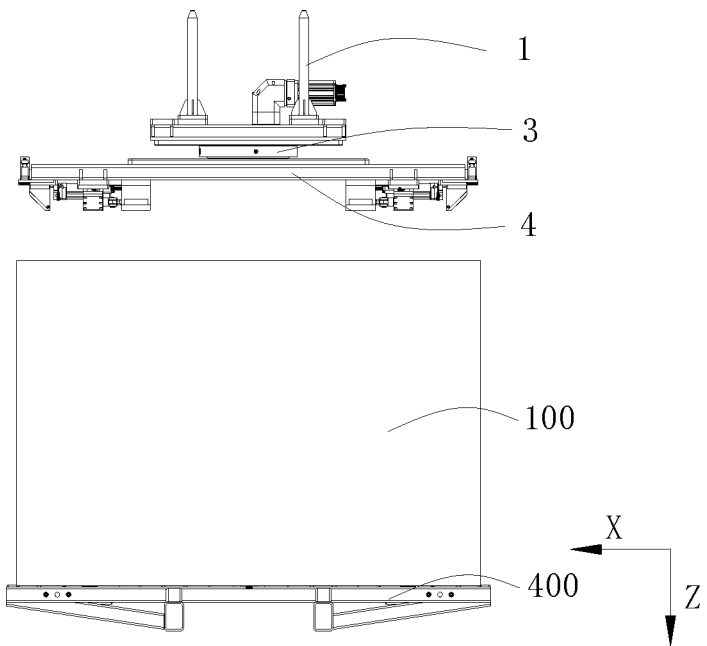
FIG. 5 is a schematic structural diagram of a transfer apparatus and a battery to be transferred according to some embodiments of this application.
Figure 6:
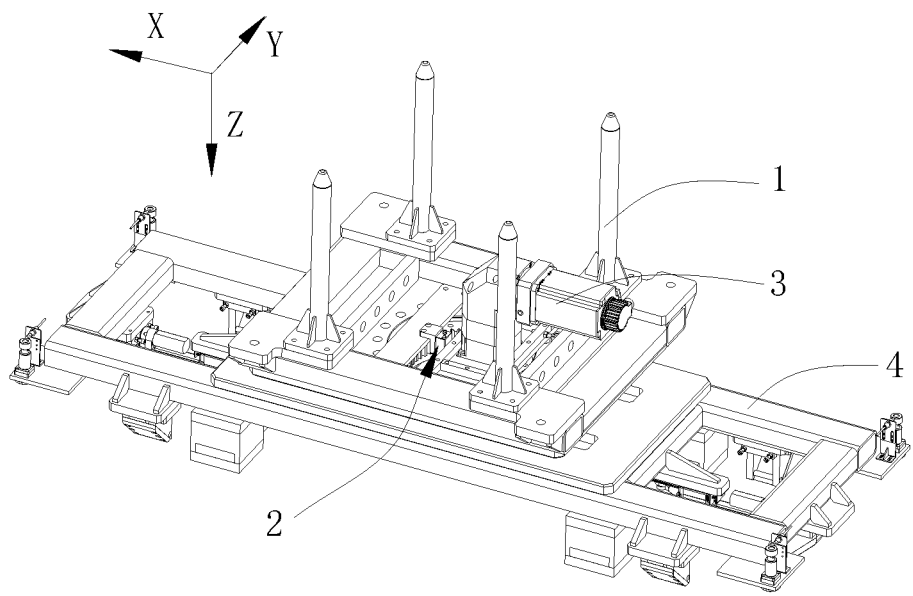
FIG. 6 is a schematic three-dimensional structural diagram of a transfer apparatus according to some embodiments of this application from one perspective.
Figure 7:
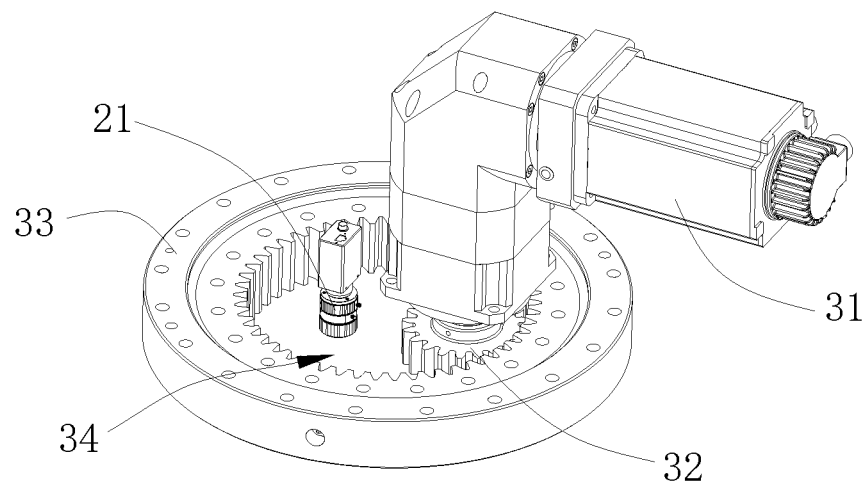
FIG. 7 is a schematic three-dimensional structural diagram of a rotating and adjusting assembly and a positioning assembly according to some embodiments of this application.

According to some embodiments of this application, refer to FIG. 5 to FIG. 7. This application provides a transfer apparatus. The transfer apparatus includes a frame 1, a positioning assembly 2, a rotating and adjusting assembly 3, and a fixture assembly 4, where the positioning assembly 2 is configured to obtain position information of a battery 100 to be transferred; the rotating and adjusting assembly 3 includes a first drive member 31, and a first gear 32 and a second gear 33 engaged with each other, where the first gear 32 is connected to the first drive member 31, and the second gear 33 is rotatably connected to the frame 1; the fixture assembly 4 is configured to grip or release the battery 100 to be transferred, and the fixture assembly 4 is connected to a side of the second gear 33 away from the frame 1; and the first drive member 31 is configured to drive, according to the position information, the first gear 32 to rotate such that the first gear 32 drives the second gear 33 and the fixture assembly 4 to rotate.

A side of the frame 1 away from the fixture assembly 4 may be connected to a truss, so that the truss drives the frame 1 to move between a region A and a region B so as to transfer the battery. The region A and the region B may specifically be a region where a vehicle with a battery to be replaced is located, a region where a secondary battery can be charged, a battery processing region, a battery storage region, or the like. Persons skilled in the art can understand that the truss can drive the frame 1 to move horizontally in an X-axis direction or a Y-axis direction shown in FIG. 6 and can also drive the frame 1 to move in a vertical direction.

The positioning assembly 2 is configured to obtain position information of the battery 100 to be transferred. Specifically, the positioning assembly 2 may obtain the position information of the battery 100 to be transferred through technologies such as acoustic positioning, infrared positioning, and framing positioning. When the positioning assembly 2 uses the acoustic positioning technology to obtain the position information, the positioning assembly 2 may include a plurality of ultrasonic receivers. An ultrasonic transmitter in the battery 100 to be transferred sends ultrasonic pulses at a specified time interval. The plurality of ultrasonic receivers receive pulse signals from the ultrasonic transmitter separately. The position information of the battery 100 to be transferred is determined according to a time sequence at which different ultrasonic receivers receive the signals. When the positioning assembly 2 uses the infrared positioning technology to obtain the position information, the positioning assembly 2 may include an infrared transmitter and an infrared receiver, where the infrared transmitter sends out an infrared scanning signal, the infrared scanning signal is reflected when encountering the battery 100 to be transferred, and the infrared receiver receives the reflected signal and can obtain the position information according to the reflected signal. There are various ways to position the battery 100 to be transferred. Persons skilled in the art can use the existing positioning technology to obtain the position information of the battery 100 to be transferred. Details are not described herein.

The rotating and adjusting assembly 3 is capable of rotating the fixture assembly 4 to adjust a relative positional relation between the fixture assembly 4 and the battery 100 to be transferred. The first drive member 31 may be a servo motor fastened to the frame 1, and an output shaft of the first drive member 31 is connected to the first gear 32, thus driving the first gear 32 to rotate. The first gear 32 and the second gear 33 are engaged with each other, so that rotation of the first gear 32 can drive the second gear 33 to rotate. The second gear 33 is connected to the fixture assembly 4, so that the rotation of the first gear 32 can drive the second gear 33 and the fixture assembly 4 to rotate together along the central axis of the second gear 33. The first gear 32 and/or the second gear 33 may be provided in plurality to form an N-layer gear transmission structure. A plurality of first gears 32 may be sequentially in engaged connection with each other, and then one or more first gears 32 are engaged with the second gear 33. Alternatively, a plurality of first gears 32 are separately engaged with the second gear 33. Persons skilled in the art can set the number and a transmission sequence of the first gear 32 and the second gear 33 based on the needs of different transmission ratio changes.

In this application, the positioning assembly 2 is provided to obtain the position information of the battery 100 to be transferred, so that the rotating and adjusting assembly 3 is capable of adjusting a positional relationship between the fixture assembly 4 and the battery 100 to be transferred according to the position information, making the transfer apparatus more intelligent. The first drive member 31, the first gear 32, and the second gear 33 are provided, so that the first drive member 31 drives the first gear 32 to rotate such that the first gear 32 drives the second gear 33 and the fixture assembly 4 to rotate. The fixture assembly 4 and the battery 100 to be transferred can align with each other accurately in a vertical direction, so that the probability of the fixture assembly 4 successfully picking up the battery 100 to be transferred is increased, improving the transferring efficiency.

The first gear 32 is an outer gear, the second gear 33 is an inner gear having a mounting hole 34, and the outer gear is disposed in the mounting hole 34 and engaged with the inner gear. Optionally, the central axis of the inner gear and the central axis of the mounting hole 34 may be located on a same straight line. The central axes of the outer gear and the inner gear may not be located on a same straight line, that is, the central axis of the inner gear deviates from the central axes of the outer gear and the mounting hole 34, and the pitch circle of the outer gear is internally tangent to the pitch circle of the inner gear.

The inner gear and the outer gear are engaged with each other, so that a spacing distance between the central axis of the first gear 32 and the central axis of the second gear 33 is reduced. This makes the rotating and adjusting assembly 3 more compact, achieving great space utilization and an overall compact size.

In some embodiments, the positioning assembly 2 includes a camera 21 connected to the frame 1, where the camera 21 is configured to acquire an image of the battery 100 to be transferred, generate the position information according to the image, and send the position information to the rotating and adjusting assembly 3; and the rotating and adjusting assembly 3 is configured to control the first drive member 31 according to the position information. For example, the camera 21 takes an image containing the battery 100 to be transferred, identifies a preset marker in the image, and generates position information of the battery 100 to be transferred based on the coordinates of the preset marker in the image. Certainly, there are various ways to generate the position information according to the image, and persons skilled in the art can obtain the position information by choosing a suitable method to analyze and calculate based on the needs. Details are not described herein.

The position information may be position coordinates of the battery 100 to be transferred based on the world coordinate system or may be an angular deviation value and a horizontal deviation value obtained based on a coordinate system of the battery 100 to be transferred with respect to the fixture assembly 4. In a case that the position information includes the angular deviation value and the horizontal deviation value, when the angular deviation value is greater than a first preset deviation value, the first drive member 31 rotates to enable the fixture assembly 4 to rotate on the basis of no change in height until the angular deviation value is less than the first preset deviation value, and when the horizontal deviation value is greater than a second preset deviation value, the frame 1 can be moved by the truss to enable the fixture assembly 4 to move in the X-axis direction and/or the Y-axis direction on the basis of no change in height until the horizontal deviation value is less than the second preset deviation value, thus ensuring that the fixture assembly 4 and the battery 100 to be transferred can align with each other accurately in the vertical direction. The first preset deviation value and the second preset deviation value are values preset by persons skilled in the art.

The provision of the camera 21 allows visual positioning on the battery 100 to be transferred, thus improving the accuracy of alignment in the vertical direction between the fixture assembly 4 and the battery 100 to be transferred.

The camera 21 may be provided in the mounting hole 34 of the second gear 33, thus avoiding the second gear 33 blocking framing of the camera 21. In addition, in some embodiments, the central axis of the first gear 32 deviates from the central axes of the second gear 33 and the mounting hole 34, so that the first gear 32 moves in the mounting hole 34 along a movement trajectory around the central axis of the mounting hole 34. The camera 21 may be disposed along the central axis of the mounting hole 34, thus avoiding interference between the camera 21 and the first gear 32. Certainly, the camera 21 may alternatively be disposed on a side of the second gear 33 away from the fixture assembly 4, and ambient light runs through the mounting hole 34 to enter a viewfinder of the camera 21.

Figure 8:
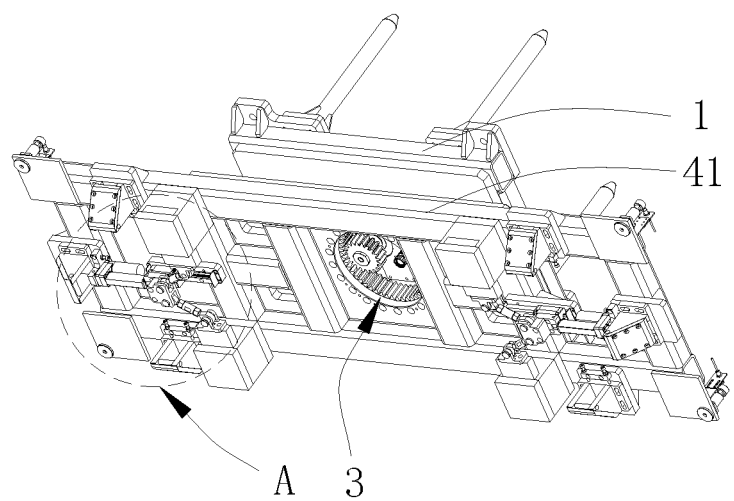
FIG. 8 is a schematic three-dimensional structural diagram of a transfer apparatus according to some embodiments of this application from another perspective.
Figure 9:
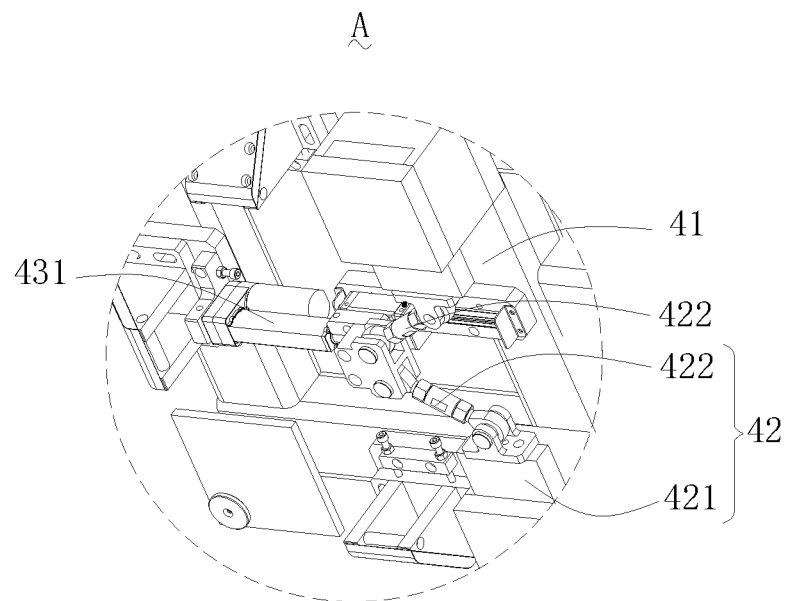
FIG. 9 is an enlarged schematic structural diagram of part A in FIG. 8.
Figure 10:
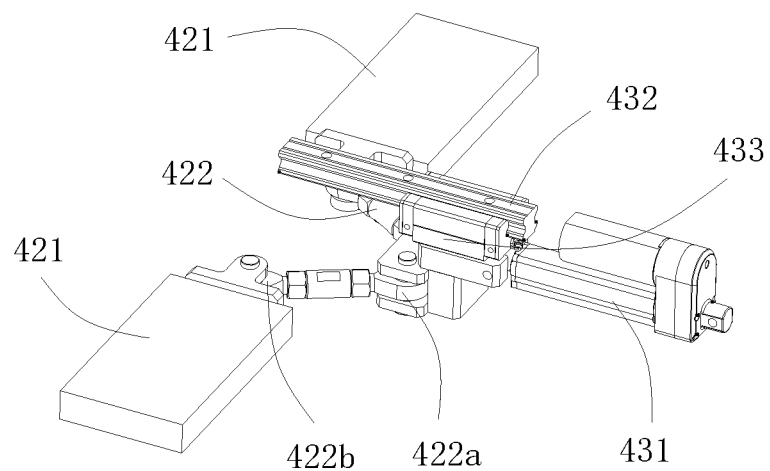
FIG. 10 is a schematic three-dimensional structural diagram of a fixture assembly according to some embodiments of this application.
Figure 11:
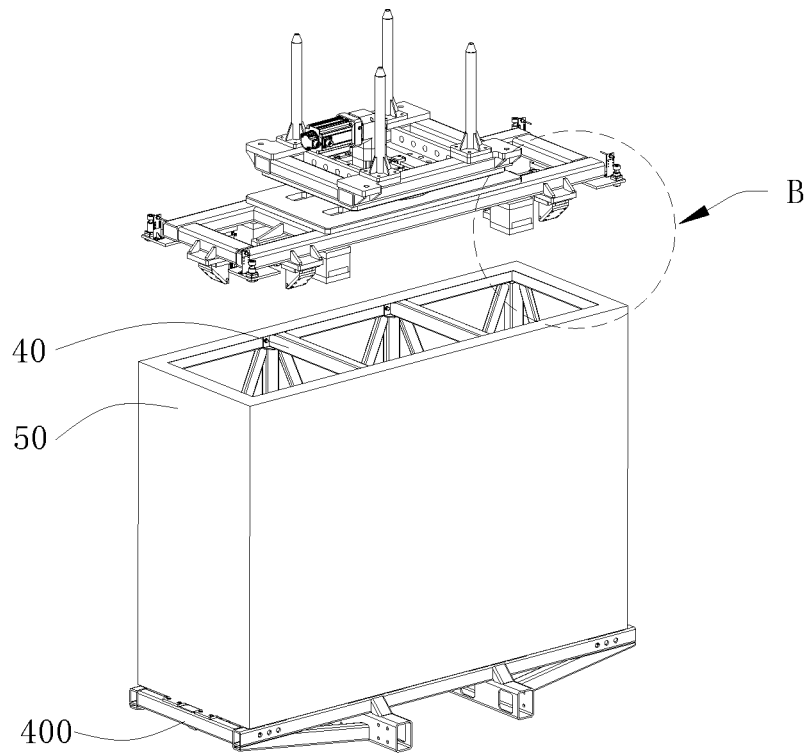
FIG. 11 is a schematic three-dimensional structural diagram of a transfer apparatus in a state moving above a battery to be transferred according to some embodiments of this application.
Figure 12:
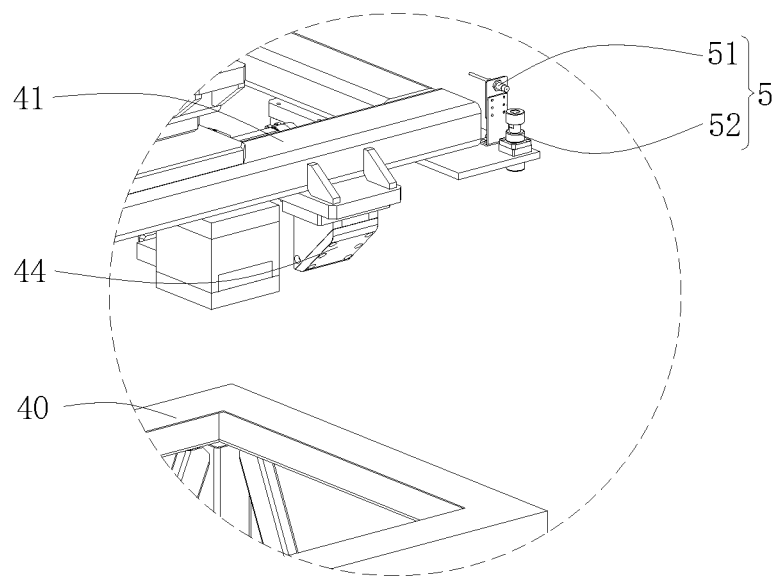
FIG. 12 is an enlarged schematic structural diagram of part B in FIG. 11.
Figure 13:
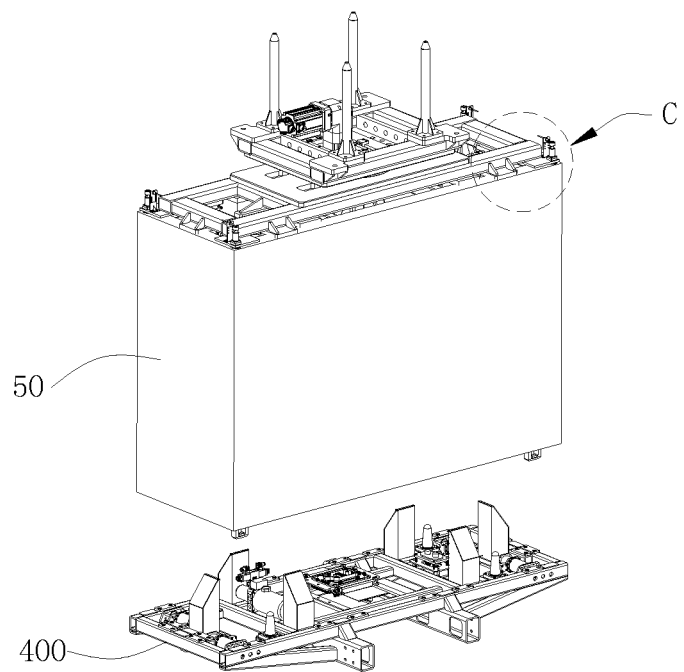
FIG. 13 is a schematic three-dimensional structural diagram of a transfer apparatus in a state gripping a battery to be transferred according to some embodiments of this application.
Figure 14:
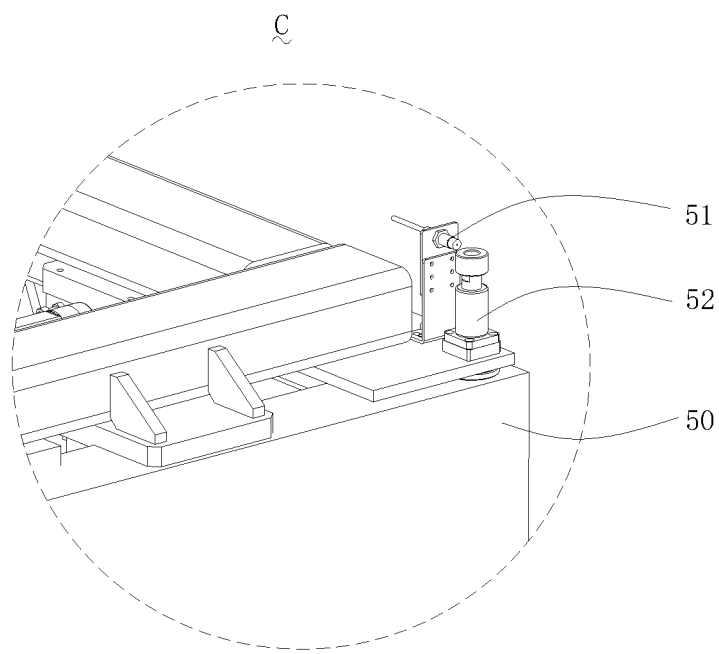
FIG. 14 is an enlarged schematic structural diagram of part C in FIG. 13.

Referring to FIG. 8 to FIG. 10, in some embodiments, the fixture assembly 4 includes a base 41 connected to the second gear 33, two clamping members 42 spaced apart, and a drive component 43 disposed on the base 41, where the drive component 43 is configured to drive the two clamping members 42 to approach or leave each other so as to switch between a closed position and a clamping position.

The two clamping members 42 move close to each other to the closed position, and the position occupied by the two clamping members 42 is small to facilitate insertion into the box of the battery 100 to be transferred. After the fixture assembly 4 falls in the vertical direction, the clamping members 42 move into the box of the battery 100 to be transferred. The drive component 43 drives the clamping members 42 to move such that the two clamping members 42 move away from each other to the clamping position, occupying a large position by the two clamping members 42. The ends of the two clamping members 42 may abut against two opposite side plates 50 of the battery 100 to be transferred, or the two clamping members 42 may be clamped to a preset clamping structure in the battery 100 to be transferred, for example, clamped to a cross beam of the bracket 40, so that the fixture assembly 4 can grip the battery 100 to be transferred. The drive component 43 drives the two clamping members 42 to approach or leave each other so as to grip or release the battery 100 to be transferred.

The drive component 43 includes a second drive member 431 reciprocating along a first direction, the clamping member 42 includes a clamping jaw 421 and a connecting rod 422, and two opposite ends of the connecting rod 422 are rotatably connected to the second drive member 431 and the clamping jaw 421 respectively; and the second drive member 431 drives, via two connecting rods 422, two clamping jaws 421 to approach or leave each other along a second direction; where the first direction and the second direction intersect. The second drive member 431 is rotatably connected to two connecting rods 422, so that two clamping jaws 421 can approach or leave each other through unidirectional movement of one second drive member 431.

The drive component 43 further include a guide rail 432 disposed on the base 41 and a mounting seat 433 moving along the guide rail 432, where the guide rail 432 is disposed in the first direction. The second drive member 431 drives the mounting seat 433 to move along the guide rail 432. A first end 422a of the connecting rod 422 is rotatably connected to the mounting seat 433, and a second end 422b of the connecting rod 422 is rotatably connected to the clamping jaw 421. When the second drive member 431 pushes the mounting seat 433 to move close to the clamping jaw 421 in the first direction, the first end 422a and the mounting seat 433 move together close to the clamping jaw 421 in the first direction, and the second ends 422b of the two connecting rods 422 respectively push the two clamping jaws 421 to leave each other along the second direction. When the second drive member 431 pushes the mounting seat 433 to move away from the clamping jaw 421 in the first direction, the first end 422a and the mounting seat 433 move together away from the clamping jaw 421 in the first direction, and the second ends 422b of the two connecting rods 422 respectively pull the two clamping jaws 421 to leave each other along the second direction. The provision of the guide rail 432 can restrict the drive component 43 to move the connecting rod 422 in the first direction.

A guide structure may be further provided on the base 41 to restrict the clamping jaw 421 to move in the second direction. In some embodiments, the base 41 is provided with a guide slot that extends along the second direction, and the clamping jaw 421 is snapped fit into the guide slot and is capable of moving along the guide slot. The guide slot is provided to restrict the clamping jaw 421 to move along the second direction.

In some embodiments, the fixture assembly 4 is provided in plurality, and the plurality of fixture assemblies 4 are spaced apart sequentially along the first direction. In the embodiments shown in FIG. 8, two fixture assemblies 4 are provided, where the two fixture assemblies 4 are disposed symmetrically with respect to the central axis of the second gear 33. The plurality of fixture assemblies 4 can increase load weight of the transfer apparatus, increase acting points of the fixture assembly 4 on the battery 100 to be transferred when the fixture assembly 4 is gripping the battery 100 to be transferred, and improve the stability of the battery 100 to be transferred in the transfer process. Certainly, persons skilled in the art can arrange an appropriate quantity of fixture assemblies 4 according to the weight and size of the battery 100 to be transferred.

The fixture assembly 4 further includes a plurality of guide members 44 connected to the base 41, where a surface of the guide member 44 away from the center of the fixture assembly 4 is an oblique plane. The guide member 44 may be disposed at the edge of the base 41. The plurality of guide members 44 are disposed on different sides of the base 41 respectively. During the movement of the fixture assembly 4 to the box, the oblique plane of the guide member 44 may be in contact with the box, thus guiding the fixture assembly 4 to move into the box. Therefore, the provision of the plurality of guide members 44 facilitates the movement of the fixture assembly 4 into the box and improves the efficiency of the fixture assembly 4 in gripping the battery to be transferred.

In some embodiments, the transfer apparatus further includes a horizontal traveling mechanism and a lifting mechanism, where the horizontal traveling mechanism is capable of driving the frame 1 to move in a horizontal direction, and the lifting mechanism is capable of driving the frame 1 to move in a vertical direction.

During the operation of the transfer apparatus, the transfer apparatus can first move the frame 1 to above the battery 100 to be transferred via the horizontal traveling mechanism, so that the positioning assembly 2 can obtain position information of the battery to be transferred. The rotating and adjusting assembly 3 and the horizontal traveling mechanism adjust relative positions of the fixture assembly 4 and the battery 100 to be transferred according to the position information, so that the fixture assembly 4 and the battery 100 to be transferred align with each other in the vertical direction. The lifting mechanism drives the frame 1 to fall in the vertical direction until the fixture assembly 4 is in contact with the battery 100 to be transferred, and the clamping jaw 421 in the fixture assembly 4 moves to the clamping position, so that the fixture assembly 4 is connected to the battery 100 to be transferred. The lifting mechanism drives the frame 1 to rise in the vertical direction, so that the battery 100 to be transferred is separated from the mounting base 400. The horizontal traveling mechanism moves the battery 100 to be transferred to a preset position, the clamping jaw 421 in the fixture assembly 4 moves to the closed position, the lifting mechanism drives the frame 1 to rise in the vertical direction, the fixture assembly 4 is separated from the battery 100 to be transferred, and the battery 100 to be transferred is transferred. The horizontal traveling mechanism and the lifting mechanism are able to adjust relative positions of the fixture assembly 4 and the battery 100 to be transferred.

Referring to FIG. 11 to FIG. 14, the transfer apparatus further includes at least one in-place sensing assembly 5, where the in-place sensing assembly 5 includes a position sensor 51 and a movable member 52, the position sensor 51 is disposed on the base 41 and is in signal connection with the fixture assembly 4, the movable member 52 penetrates through the base 41 in the vertical direction and is capable of moving along the vertical direction to enter or leave a sensing region of the position sensor 51, the position sensor 51 is configured to detect whether the movable member 52 enters the sensing region and send a detection signal to the fixture assembly 4, and the fixture assembly 4 is configured to grip or release, based on the detection signal, the battery 100 to be transferred.

When the movable member 52 moves into the sensing region of the position sensor 51, the position sensor 51 detects the movable member 52 and sends the detection signal to the fixture assembly 4. After receiving the detection signal, the fixture assembly 4 switches to the clamping position to grip or release the battery 100 to be transferred. The position sensor 51 may further be in signal connection with the lifting mechanism, so that when the movable member 52 moves to the sensing region of the position sensor 51, the position sensor 51 can send the detection signal to the lifting mechanism, and the lifting mechanism stops the falling of the frame 1 after receiving the detection signal. For example, when the fixture assembly 4 vertically aligns with the battery 100 to be transferred, the movable member 52 vertically aligns with the top of the battery 100 to be transferred, the lifting mechanism drives the frame 1 to fall in the vertical direction until the movable member 52 touches the top of the battery 100 to be transferred, and the lifting mechanism drives the frame 1 to continue to fall in the vertical direction. The movable member 52 is blocked by the top of the battery 100 to be transferred, so that the movable member 52 remains relatively stationary with the battery 100 to be transferred, and the movable member 52 undergoes relative displacement with the position sensor 51. When the movable member 52 moves in the vertical direction to the sensing region of the position sensor 51, the position sensor 51 senses the movable member 52, indicating that the fixture assembly 4 has moved into the battery 100 to be transferred, and at this time the fixture assembly 4 can be controlled to clamp the battery 100 to be transferred. The provision of the position sensor 51 and the movable member 52 allows detection of a positional relationship in the vertical direction between the fixture assembly 4 and the battery 100 to be transferred, thus increasing the success rate of the fixture assembly 4 in gripping the battery 100 to be transferred.

According to some embodiments of this application, referring to FIG. 5 to FIG. 7, this application provides a transfer apparatus for transferring battery. The transfer apparatus includes a frame 1, a positioning assembly 2, a rotating and adjusting assembly 3, and a fixture assembly 4, where the positioning assembly 2 is configured to obtain position information of a battery 100 to be transferred; the rotating and adjusting assembly 3 includes a first drive member 31, and a first gear 32 and a second gear 33 engaged with each other, where the first gear 32 is connected to the first drive member 31, and the second gear 33 is rotatably connected to the frame 1; the fixture assembly 4 is configured to grip or release the battery 100 to be transferred, and the fixture assembly 4 is connected to a side of the second gear 33 away from the frame 1; and the first drive member 31 is configured to drive, according to the position information, the first gear 32 to rotate such that the first gear 32 drives the second gear 33 and the fixture assembly 4 to rotate. The positioning assembly 2 is provided to obtain the position information of the battery 100 to be transferred, so that the rotating and adjusting assembly 3 is capable of adjusting a positional relationship between the fixture assembly 4 and the battery 100 to be transferred according to the position information, making the transfer apparatus more intelligent. The first drive member 31, the first gear 32, and the second gear 33 are provided, so that the first drive member 31 drives the first gear 32 to rotate such that the first gear 32 drives the second gear 33 and the fixture assembly 4 to rotate. The fixture assembly 4 and the battery 100 to be transferred can align with each other accurately in a vertical direction, so that the probability of the fixture assembly 4 successfully picking up the battery 100 to be transferred is increased, improving the transferring efficiency.

Although this application has been described with reference to some preferred embodiments, various modifications to this application and replacements of the components therein with equivalents can be made without departing from the scope of this application. In particular, as long as there is no structural conflict, the various technical features mentioned in the embodiments can be combined in any manners. This application is not limited to the specific embodiments disclosed in this specification, but includes all technical solutions falling within the scope of the claims.

What is claimed is:

1. A transfer apparatus for transferring battery, wherein the transfer apparatus comprises:
    a frame;
    a positioning assembly, configured to obtain position information of a battery to be transferred;
    a carrier configured to move along intersecting rails;
    a rotating and adjusting assembly, comprising a first drive member in signal connection with the positioning assembly, and a first gear and a second gear engaged with each other, wherein the first gear is connected to the first drive member, and the second gear is rotatably connected to the frame and the carrier, the first gear and the second gear being coaxially arranged as inner and outer gears, the outer gear disposed within a central mounting hole of the inner gear;
    at least one fixture assembly configured to grip or release the battery to be transferred, wherein the at least one fixture assembly is connected to a side of the second gear away from the frame, and the first drive member is configured to drive, according to the position information, the first gear to rotate such that the first gear drives the second gear and the at least one fixture assembly to rotate together; and
    at least one in-place sensing assembly connected to the at least one fixture assembly and configured to detect when the fixture assembly reaches a vertically aligned position with the battery to be transferred and detect a positional relationship in a vertical direction between the at least one fixture assembly and the battery to be transferred, and to trigger clamping or release of the battery to be transferred based on the detected alignment,
    wherein the positioning assembly comprises a camera connected to the frame and disposed in the mounting hole and along a central axis of the mounting hole, the camera being configured to acquire an image of the battery to be transferred, generate the position information according to the image, and send the position information to the rotating and adjusting assembly; and the rotating and adjusting assembly is configured to control the first drive member according to the position information.

2. The transfer apparatus according to claim 1, wherein the at least one fixture assembly comprises a base connected to the second gear, two clamping members spaced apart, and a drive component disposed on the base, wherein the drive component is configured to drive the two clamping members to approach or leave each other so as to switch between a closed position and a clamping position.

3. The transfer apparatus according to claim 2, wherein the drive component comprises a second drive member reciprocating along a first direction, each one of the two clamping members comprises a clamping jaw and a connecting rod, and two opposite ends of the connecting rod are rotatably connected to the second drive member and the clamping jaw respectively; and the second drive member is capable of driving, via the two connecting rods of the two clamping members, the two clamping jaws to approach or leave each other along a second direction; wherein the first direction and the second direction intersect.

4. The transfer apparatus according to claim 3, wherein the base is provided with a guide slot that extends along the second direction, and the clamping jaw is snapped fit into the guide slot and is capable of moving along the guide slot.

5. The transfer apparatus according to claim 3, wherein the at least one fixture assembly comprises a plurality of fixture assemblies spaced apart sequentially along the first direction.

6. The transfer apparatus according to claim 2, wherein the at least one fixture assembly further comprises a plurality of guide members connected to the base, wherein a surface of the guide member away from the center of the at least one fixture assembly is an oblique plane.

7. The transfer apparatus according to claim 1, further comprising a horizontal traveling mechanism and a lifting mechanism, wherein the horizontal traveling mechanism is capable of driving the frame to move in a horizontal direction, and the lifting mechanism is capable of driving the frame to move in a vertical direction.

8. The transfer apparatus according to claim 7, wherein the in-place sensing assembly further comprises a position sensor and a movable member, the position sensor is disposed on a base and is in signal connection with the at least one fixture assembly, the movable member penetrates through the base in the vertical direction and is capable of moving along the vertical direction to enter or leave a sensing region of the position sensor, the position sensor is configured to detect whether the movable member enters the sensing region and send a detection signal to the at least one fixture assembly, and the at least one fixture assembly is configured to grip or release, based on the detection signal, the battery to be transferred.

* * * * *